United States Patent
Yun et al.

(10) Patent No.: US 12,025,797 B2
(45) Date of Patent: Jul. 2, 2024

(54) COMPACT HEADS-UP DISPLAY

(71) Applicant: 3M INNOVATIVE PROPERTIES COMPANY, St. Paul, MN (US)

(72) Inventors: Zhisheng Yun, Sammamish, WA (US); Hao Wu, Shanghai (CN); Stephen J. Willett, St. Paul, MN (US); Craig R. Schardt, Woodbury, MN (US); Stephan J. Pankratz, Eagan, MN (US); Gilles J. Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 575 days.

(21) Appl. No.: 17/414,653

(22) PCT Filed: Dec. 17, 2019

(86) PCT No.: PCT/IB2019/060933
§ 371 (c)(1),
(2) Date: Jun. 16, 2021

(87) PCT Pub. No.: WO2020/128841
PCT Pub. Date: Jun. 25, 2020

(65) Prior Publication Data
US 2022/0057632 A1    Feb. 24, 2022

Related U.S. Application Data

(60) Provisional application No. 62/783,648, filed on Dec. 21, 2018.

(51) Int. Cl.
*G02B 27/01* (2006.01)
*G02B 27/28* (2006.01)
*G02F 1/1335* (2006.01)

(52) U.S. Cl.
CPC ..... *G02B 27/0101* (2013.01); *G02B 27/0149* (2013.01); *G02B 27/286* (2013.01); *G02F 1/133536* (2013.01); *G02B 2027/015* (2013.01)

(58) Field of Classification Search
CPC ........... G02B 27/0101; G02B 27/0149; G02B 27/286; G02B 2027/015; G02F 1/133536
(Continued)

(56) References Cited

U.S. PATENT DOCUMENTS 5,882,774 A    3/1999   Jonza
9,823,472 B2   11/2017  Kim
(Continued)

FOREIGN PATENT DOCUMENTS

CN    108873351 A    11/2018
DE    102014211339   12/2015
(Continued)

OTHER PUBLICATIONS

International Search report for PCT International Application No. PCT/IB2019/060933 mailed on Mar. 11, 2020, 4 pages.

*Primary Examiner* — Joseph P Martinez
*Assistant Examiner* — Grant A Gagnon
(74) *Attorney, Agent, or Firm* — Jonathan L. Tolstedt

(57) ABSTRACT

An optical system, including a reflective polarizer, and a display and a mirror disposed on a same side of, and generally facing, the reflective polarizer. The reflective polarizer may transmit at least 80% of incident light having a first polarization state and may reflect at least 80% of incident light having a second polarization state, and the mirror may reflect at least 80% of the incident light for each of the first and second polarization states. The central locations of the display, reflective polarizer, and mirror may define a midplane which includes first, second, and third regions, such that the first region includes portions of the
(Continued)

image rays that pass at least once across the region, the second region includes portions of the image rays that pass at least twice across the region, and the third region includes portions of the image rays that pass three times across the region. The first, second, and third regions may have respective areas A1, A2, and A3, such that A3/A2 is greater than or equal to about 0.20, or 0.22, or 0.24, or 0.26, or 0.28, or 0.30.

20 Claims, 13 Drawing Sheets

(58) Field of Classification Search
USPC .......................................................... 359/633
See application file for complete search history.

(56) References Cited

U.S. PATENT DOCUMENTS

| 10,031,368 | B2 | 7/2018 | Otani |
| 2016/0303974 | A1 | 10/2016 | Yonetani et al. |
| 2017/0163911 | A1 | 6/2017 | El-Ghoroury et al. |
| 2017/0235136 | A1 | 8/2017 | Kim |
| 2017/0269428 | A1 | 9/2017 | Otani |
| 2017/0315351 | A1 | 11/2017 | Yamazoe |

FOREIGN PATENT DOCUMENTS

| EP | 3006988 A1 | 4/2016 |
| JP | 2004226469 A | 8/2004 |
| JP | 2018036501 A | 3/2018 |
| JP | 2018077435 A | 5/2018 |

COMPACT HEADS-UP DISPLAY

CROSS REFERENCE TO RELATED APPLICATIONS

This application is a national stage filing under 35 U.S.C. 371 of PCT/IB2019/060933, filed Dec. 17, 2019, which claims the benefit of provisional Application No. 62/783,648, filed Dec. 21, 2018, the disclosure of which is incorporated by reference in its/their entirety herein.

SUMMARY

In some aspects of the present description, an optical system is provided, including a reflective polarizer, and a display and a mirror disposed on a same side of, and generally facing, the reflective polarizer. For normally incident light in a predetermined wavelength range extending across at least a portion of a visible spectrum, the reflective polarizer may transmit at least 80% of the incident light having a first polarization state and may reflect at least 80% of the incident light having an orthogonal second polarization state, and the mirror may reflect at least 80% of the incident light for each of the first and second polarization states. The display may be adapted to emit an image for viewing by a viewer, the emitted image including an emitted central image cone emitted from a central location of the display. The emitted central image cone may include an emitted central image ray emitted from the central location of the display at a central emission angle greater than about 5 degrees. The reflective polarizer may receive the emitted central image ray at a first incident angle at a central location of the reflective polarizer and may reflect at least 80% of the received emitted central image ray as a first reflected image ray. The mirror may receive the first reflected image ray at a second incident angle at a central location of the mirror and may reflect at least 80% of the received first reflected image ray as a second reflected image ray. The reflective polarizer may receive and transmit at least 80% of the second reflected image ray. The central locations of the display, the reflective polarizer, and the mirror may define a midplane which includes first, second, and third regions, such that for emitted image rays emitted from the display and propagating along and in the midplane and prior to being incident on the reflective polarizer for a second time: the first region includes portions of the emitted image rays that pass at least once across the first region, the second region includes portions of the emitted image rays that pass at least twice across the second region, and the third region includes portions of the emitted image rays that pass three times across the third region. The first, second, and third regions may have respective areas A1, A2, and A3, such that A3/A2 is greater than or equal to about 0.20, or 0.22, or 0.24, or 0.26, or 0.28, or 0.30.

In some aspects of the present description, an optical system is provided, including a reflective polarizer, a display, and a mirror. For normally incident light in a predetermined wavelength range extending across at least from about 450 nm to about 600 nm, the reflective polarizer may transmit at least 60% of the incident light having a first polarization state and may reflect at least 60% of the incident light having an orthogonal second polarization state, and the mirror may reflect at least 50% of the incident light for each of the first and second polarization states. An image may be emitted by the display and transmitted by the reflective polarizer for viewing by a viewer, after being first reflected by the reflective polarizer and the mirror. The optical system may have an optical axis such that a light ray emitted by the display and propagating along the optical axis is substantially normally incident on the mirror after being reflected by the reflective polarizer. A midplane of the optical axis may be defined including one-pass and three-pass regions having respective areas A1 and A3. The midplane may be defined such that, for emitted image rays emitted from the display and propagating along and in the midplane and prior to being incident on the reflective polarizer for a second time, the one-pass region includes portions of the emitted image rays that pass at least once across the one-pass region, and the three-pass region includes portions of the emitted image rays that pass three times across the three-pass region, such that A3/A1 is greater than or equal to 0.2. When an image having a spatial frequency of about 12 line-pairs per mm is emitted from a corner of the display, the optical system may magnify the emitted image, after the emitted image is transmitted by the reflective polarizer, as a virtual image for viewing by a viewer, a tangential modulation transfer function (MTF) of the virtual image is greater than about 0.3.

In some aspects of the present description, an optical system is provided, including a reflective polarizer, a display, and a mirror. For normally incident light in a predetermined wavelength range extending across at least from about 450 nm to about 600 nm: the reflective polarizer may transmit at least 60% of the incident light having a first polarization state and may reflect at least 60% of the incident light having an orthogonal second polarization state, and the mirror may reflect at least 50% of the incident light for each of the first and second polarization states. An image may be emitted by the display and transmitted by the reflective polarizer for viewing by a viewer, after being first reflected by the reflective polarizer and the mirror. The optical system may have an optical axis such that a light ray emitted by the display and propagating along the optical axis is substantially normally incident on the mirror after being reflected by the reflective polarizer. A midplane including the optical axis may be defined including one-pass and three-pass regions having respective areas A1 and A3. The midplane may be defined such that, for emitted image rays emitted from the display and propagating along and in the midplane and prior to being incident on the reflective polarizer for a second time: the one-pass region includes portions of the emitted image rays that pass at least once across the one-pass region, and the three-pass region includes portions of the emitted image rays that pass three times across the three-pass region, such that A3/A1 is greater than 0.2.

When an image having a spatial frequency of about 12 line pairs per mm is emitted from the display, the optical system may magnify the emitted image, after the emitted image is transmitted by the reflective polarizer, as a virtual image for viewing by a viewer, the virtual image having first and second tangential modulation transfer functions (MTF1, MTF2) for the image emitted from respective diagonally opposite first and second corners of the display, a difference between MTF1 and MTF2 being less than about 0.03, or about 0.02 or about 0.01.

DETAILED DESCRIPTION

Figure 1:
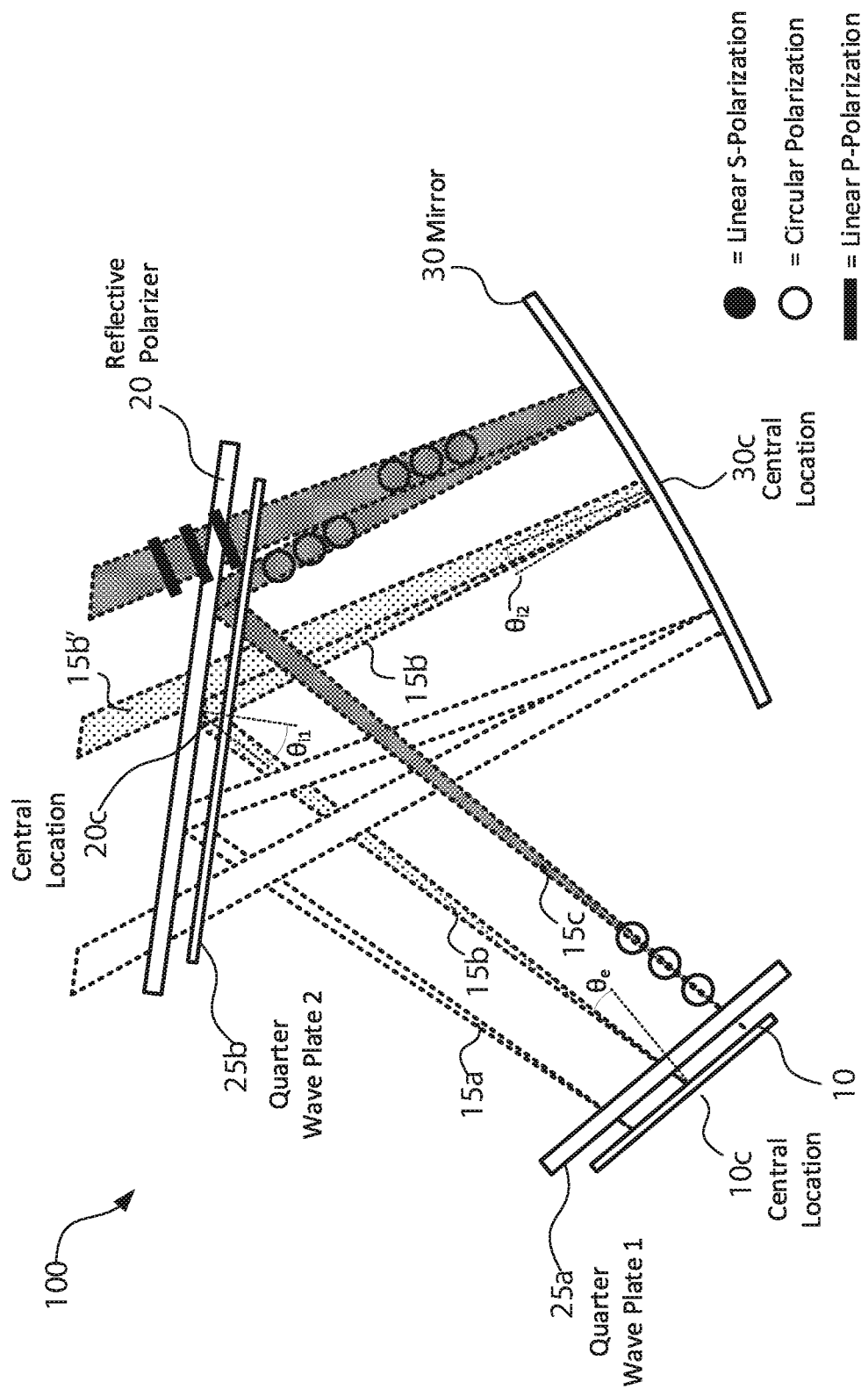
FIG. 1 is a cross-sectional view of a compact heads-up display in accordance with an embodiment described herein.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, an optical system, such as a system that is part of a compact heads-up display (HUD), is provided, including a reflective polarizer, and a display and a mirror disposed on a same side of, and generally facing, the reflective polarizer. For normally incident light in a predetermined wavelength range extending across at least a portion of a visible spectrum (e.g., from about 450 nanometers (nm) to about 600 nm, or from about 560 nm to about 610 nm), the reflective polarizer may transmit at least 80% of the incident light having a first polarization state and may reflect at least 80% of the incident light having an orthogonal second polarization state. For example, the reflective polarizer may be a linear reflective polarizer, allowing at least 80% of light with an s-type linear polarization to pass through (i.e., be transmitted), and reflect at least 80% of light with a p-type linear polarization. In another example, the reflective polarizer may substantially transmit p-polarized light and substantially reflect s-polarized light. In some example embodiments, the reflective polarizer may be a multilayer optical film. In some embodiments, the reflective polarizer may be a circular reference polarizer. The mirror may reflect at least 80% of the incident light for each of the first and second polarization states. That is, in some embodiments, the mirror may substantially reflect all incident light, regardless of the polarization of the light. In some embodiments, the mirror may exhibit a free-form design (i.e., a non-rotationally symmetric mirror featuring departures from a best-fit spherical surface.) The use of a free-form mirror may provide greater control over the location, number, and size of aberrations in the image projected by the HUD (e.g., improved optical transfer functions from displayed image to projected image).

The display may be adapted to emit an image for viewing by a viewer. The display may be a picture generating unit, or PGU (e.g., a liquid crystal display or LED display), which generates an image for eventual display to the viewer (e.g., a driver of a vehicle containing the HUD). The emitted image may include an emitted central image cone emitted from a central location of the display. The emitted central image cone may include an emitted central image ray emitted from the central location of the display at a central emission angle greater than about 5 degrees, or greater than about 7 degrees, or greater than about 10 degrees. An advantage to tilting the display to achieve a central emission angle greater than, for example, about 5 degrees, is that the overall volume required for the HUD may be reduced over systems which do not use a tilted display. The display may be any appropriate size and resolution. In some embodiments, the display may have a diagonal dimension of less than about 5 inches, or less than about 4 inches, or greater than about 1 inch and less than about 5 inches.

It should be noted that the emission angle, as well as any incident angles described herein, are measured and defined as the angle the respective image ray makes relative to the surface normal at the location of incidence of the ray on the optical element (or the location of the emission of the ray from the optical element).

The reflective polarizer may receive the emitted central image ray at a first incident angle at a central location of the reflective polarizer and may reflect at least 80% of the received emitted central image ray as a first reflected image ray (e.g., reflect at least 80% of the light in a first polarization state). In some embodiments, the mirror may receive the first reflected image ray at a second incident angle at a central location of the mirror and may reflect at least 80% of the received first reflected image ray as a second reflected image ray. The reflective polarizer may receive and transmit at least 80% of the second reflected image ray (e.g., transmit at least 80% of the light in the second polarization state). In some embodiments, the HUD may also include one or more quarter wave plates which may be used to modify the polarization state of the image rays as they pass through the HUD system (e.g., to change polarization states of the light between successive encounters with the reflective polarizer).

In some embodiments, a midplane may be defined by the central locations of the display, the reflective polarizer, and the mirror. The midplane may include first, second, and third regions. These regions may be defined as follows: for image rays emitted from the display and propagating along and in the midplane, and prior to being incident on the reflective polarizer for a second time, the first region is defined by portions of the image rays that pass at least once across the first region, the second region is defined by portions of the image rays that pass at least twice across the second region, and the third region is defined by portions of the image rays that pass three times across the third region. The first, second, and third regions may have respective areas A1, A2, and A3, such that A3/A2 is greater than or equal to about 0.20, or 0.22, or 0.24, or 0.26, or 0.28, or 0.30.

According to some aspects of the present description, an optical system, such as a system that is part of a compact HUD, is provided, including a reflective polarizer, a display, and a mirror. For normally incident light in a predetermined wavelength range extending across at least from about 450 nm to about 600 nm, the reflective polarizer may transmit at least 60% of the incident light having a first polarization state (e.g., a linear s polarization type) and may reflect at least 60% of the incident light having an orthogonal second polarization state (e.g., a linear p polarization type). The mirror may reflect at least 50% of the incident light for each of the first and second polarization states.

In some embodiments, an image may be emitted by the display and transmitted by the reflective polarizer for viewing by a viewer, after being first reflected by the reflective polarizer and the mirror. For example, an image emitted by the display may strike the reflective polarizer a first time and be reflected toward the mirror. The reflected image rays may then strike the mirror and be reflected back toward the reflective polarizer. In some embodiments, the compact HUD system may also include one or more quarter wave plates, positioned within the system such that the polarization of the emitted and reflected image rays changes from one state to another as needed to either be transmitted by or reflected by the reflecting polarizer. In some embodiments, the arrangement of the display, the reflective polarizer, and the mirror, including the angle of tilt of each component, may be such that the amount of volume required by the HUD is minimized. In other words, the components of the system may be arranged such that reflected image rays pass substantially through a space or volume through which the same image rays passed before reflection (i.e., reusing common areas or volumes through which image rays have previously passed to the extent possible).

In some embodiments, the HUD may have an optical axis such that a light ray emitted by the display and propagating along the optical axis is substantially normally incident on the mirror after being reflected by the reflective polarizer. A midplane of the optical axis may be defined including one-pass and three-pass regions having respective areas A1 and A3. The midplane may be defined such that, for emitted image rays emitted from the display and propagating along and in the midplane and prior to being incident on the reflective polarizer for a second time, the one-pass region includes portions of the emitted image rays that pass at least once across the one-pass region, and the three-pass region includes portions of the emitted image rays that pass three times across the three-pass region, such that A3/A1 is greater than or equal to 0.2.

When an image having a spatial frequency of about 12 line-pairs per millimeter (mm) is emitted from a corner of the display, the HUD may magnify the emitted image, after the emitted image is transmitted by the reflective polarizer, as a virtual image for viewing by a viewer, such that a tangential modulation transfer function (MTF) of the virtual image is greater than about 0.3.

According to some aspects of the present description, an optical system is provided, including a reflective polarizer, a display, and a mirror. For normally incident light in a predetermined wavelength range extending across at least from about 450 nm to about 600 nm, the reflective polarizer may transmit at least 60% of the incident light having a first polarization state and may reflect at least 60% of the incident light having an orthogonal second polarization state, and the mirror may reflect at least 50% of the incident light for each of the first and second polarization states.

An image may be emitted by the display and transmitted by the reflective polarizer for viewing by a viewer, after being first reflected by the reflective polarizer and the mirror. The optical system may have an optical axis such that a light ray emitted by the display and propagating along the optical axis is substantially normally incident on the mirror after being reflected by the reflective polarizer. A midplane including the optical axis may be defined including one-pass and three-pass regions having respective areas A1 and A3. The midplane may be defined such that, for emitted image rays emitted from the display and propagating along and in the midplane and prior to being incident on the reflective polarizer for a second time: the one-pass region includes portions of the emitted image rays that pass at least once across the one-pass region, and the three-pass region includes portions of the emitted image rays that pass three times across the three-pass region, such that A3/A1 is greater than 0.2.

When an image having a spatial frequency of about 12 line pairs per mm is emitted from the display, the optical system may magnify the emitted image, after the emitted image is transmitted by the reflective polarizer, as a virtual image for viewing by a viewer, the virtual image having first and second tangential modulation transfer functions (MTF1, MTF2) for the image emitted from respective diagonally opposite first and second corners of the display, a difference between MTF1 and MTF2 being less than about 0.03, or about 0.02 or about 0.01.

According to some aspects of the present disclosure, a heads-up display (HUD) is provided, including an optical system as described herein, and a windshield. The windshield may be configured to reflect an image transmitted by the reflective polarizer toward the viewer (e.g., the driver of a vehicle containing the HUD), such that the viewer views a virtual image of the image emitted by the display. In some embodiments, the virtual image may be transformed by the optical system relative to the emitted image (e.g., it may be magnified by the system such that the virtual image appears larger than the emitted image).

Turning now to the figures, FIG. 1 is a cross-sectional view of a compact heads-up display (HUD) 100 in accordance with an embodiment described herein. In some embodiments, the HUD 100 includes a display 10, a reflective polarizer 20, and a mirror 30. In some embodiments, the display 10 may be a liquid crystal display (LCD) or a light-emitting diode (LED) display, or any other appropriate picture generating unit (PGU) capable of displaying information in the form of emitted rays of light. Examples of other PGUs include a laser light source, such as laser-beam scanning (LBS) PGUs, and reflective display-based PGUs, such as micro-mirror display-based PGUs and liquid crystal on silicon (LCOS) display-based PGUs. Reflective display-based PGUs may be illuminated by any appropriate light source, including but not limited to light-emitting diodes (LEDs), lasers, or combinations thereof. To direct the emitted light rays from display 10 to a point where it may be viewed by a viewer, while minimizing the amount of volume required to create the proper focal length for the projected image, emitted image rays 15 (including, for example, rays 15a, 15b, and 15c) are directed to a reflective polarizer 20, where they are reflected and redirected to mirror 30. The image rays 15 may then be reflected back to reflective polarizer 20, where they are allowed to pass through reflective polarizer 20 to be projected onto a windshield or similar surface for display to a viewer/operator as a virtual image, corresponding to the image emitted by display 10. It should be noted that the virtual image may be transformed by the optical system versus the image emitted by the display 10. For example, the mirror 30 may be shaped such that the virtual image is magnified over the emitted image, or to correct distortions that may be introduced by components of the optical system. In some embodiments, the reflective polarizer 20 may be designed such that it reflects at least 80% of incoming image rays 15 of a first polarization state, and transmits (allows to pass) at least 80% of incoming image rays 15 of a second polarization state. In other words, the reflective polarizer 20 may be either substantially reflective or substantially transmissive based on the polarization of the incoming image rays 15.

Reflective polarizer 20 may provide substantially complete transmission of one polarization of light (e.g., s-polarization) while providing selective reflection and transmission of the other polarization (e.g., p-polarization). In some embodiments, the reflective polarizer 20 may be a multilayer optical film (MOF). In such embodiments, the MOF may be a multilayer stack of alternating materials such as described in U.S. Pat. No. 5,882,774 (Jonza et al.), incorporated herein by reference. The polarization-specific reflection properties can be made wavelength specific by appropriate layer thickness selection, so that the reflective polarizer 20 is substantially transparent for all but the selected wavelengths (e.g., it becomes reflective for only p-polarized light.) The selected wavelengths may be a single narrow band, multiple narrow bands, or a broad band. Any suitable degree of reflectivity for the chosen band of wavelengths can be achieved by control of the layer-to-layer refractive index differences and the total number of layers in the reflective polarizer 20. Reflective polarizer 20 can be fabricated from tens or hundreds of co-extruded polymer layers that are substantially non-absorbing in the visible and near infrared wavelengths, such that the sum of reflectivity and transmissivity for the polarizer is nearly 100%.

In some embodiments, the mirror 30 may be a multilayer optical film (MOF).

In some embodiments, one or more quarter wave plates 25 (including first quarter wave plate 25a and second quarter wave plate 25b) may be used in HUD 100 to modify the polarization state of the image rays 15. In the example embodiment of FIG. 1, light rays 15 may be emitted from display 10 with a linear P-polarization type. The image rays 15 may then pass through a first quarter wave plate 25a, causing the polarization type of image rays 15 to change from linear P-type to circular polarization (shown on ray 15c as open circles). The image rays 15 then pass through a second quarter wave plate 25b, where the polarization type changes from circular to linear S-type. The image rays 15 reflect off of reflective polarizer 20 (which, in this embodiment, is designed to substantially reflect S-type light), and pass through quarter wave plate 25b a second time, where they are changed from S-type to circular polarization). Image rays 15 then are reflected by mirror 30 back toward reflective polarizer 20. Just before striking the reflective polarizer 20, image rays 15 pass through quarter wave plate 25b a third time, changing from circular polarization to linear P-type, which is allowed to substantially pass through reflective polarizer 20 to be projected for viewing.

It should be noted that the term "quarter wave plate," as used herein, shall include retarder plates that are approximately quarter wave. In some embodiments, the selected emission angles and incident angles may be such that a retarder plate that is approximately quarter wave, rather than precisely quarter wave, may provide better transfer. Also, in some embodiments, the quarter wave plates 25 may be composites of multiple retardation layers that, individually, are not quarter wave plates, but combine to create an effective broadband quarter wave plate (or approximately quarter wave plate). Finally, in some embodiments, the quarter wave plate 25 may be formed onto or laminated to the mirror 30. In other embodiments, the quarter wave plate 25 may be free-standing (i.e., separated from the mirror 30).

Image rays 15 are examples only, intended to show the approximate path of an emitted image through HUD 100. Three image rays 15a, 15b, and 15c are shown for illustration purposes, but are not meant to be limiting in any way. In operation, image rays 15 may be emitted from a portion of or the entirety of display 10. The totality of image rays 15 in reality define an emitted image which includes an emitted central image cone, which is emitted from a central location 10c of display 10. The emitted central image cone includes an emitted central image ray 15b that is emitted from the central location 10c of display 10 at a central emission angle $\theta_e$ greater than about 5 degrees.

The reflective polarizer 20 may then receive the emitted central image ray 15b at a first incident angle $\theta_{i1}$ at a central location 20c of reflective polarizer 20, reflecting at least 80% of the received emitted central image ray 15b as a first reflected image ray 15b', the mirror 30 receiving the first reflected image ray 15b' at a second incident angle $\theta_{i2}$ at a central location 30c of mirror 30, reflecting at least 80% of the received first reflected image ray 15b' as a second reflected image ray 15b'', the reflective polarizer 20 receiving and transmitting at least 80% of the second reflected image ray 15b''.

In some embodiments, the central locations 10c/20c/30c of display 10, reflective polarizer 20, and mirror 30 may define a midplane comprising first, second, and third regions. The first, second, and third regions are defined for emitted image rays 15 which are emitted from display 10 and which propagate along and within the midplane and prior to being incident on the reflective polarizer 20 for a second time. The first region may be defined by portions of the emitted image rays 15 that pass at least once across the first region. The second region is defined by portions of the emitted image rays 15 that pass at least twice across the second region. The third region is defined by portions of the emitted image rays 15 that pass three times across the third region. Thus defined, the first, second, and third regions define respective areas A1, A2, and A3. In some embodiments, the ratio of A3 to A2 may be greater than or equal to about 0.20, or about 0.22, or about 0.24, or about 0.26, or about 0.28, or about 0.3. In some embodiments, the relative positions and orientations of display 10, reflective polarizer 20, and mirror 30, as well as the angles $\theta_e$, $\theta_{i1}$, and $\theta_{i2}$, may be chosen so as to maximize the ratio of A3 to A2, and/or of A3 to A1, increasing the amount of volumetric space used to contain multiple passes of the images rays 15 through HUD 100. In other words, the optical path of the image rays 15 may be folded so as to achieve the appropriate focal length for a displayed image with a minimum amount of area/volume. In one example embodiment, the first incident angle, $\theta_{i1}$, may be between about 25 and about 35 degrees, and the ratio of A3/A2 greater than or equal to 0.30. In another example embodiment, the first incident angle, $\theta_{i1}$, may be greater than 45 degrees, and the ratio of A3/A2 greater than or equal to 0.30. In another example embodiment, the first incident angle, $\theta_{i1}$, may be greater than 10 degrees, and the ratio of A3/A2 greater than or equal to 0.30. In yet another example embodiment, the first incident angle, $\theta_{i1}$, may be between 15 and 20 degrees, and the ratio of A3/A2 greater than or equal to 0.40. FIGS. 3A through 5C provide additional details on the areas A1, A2, and A3.

It is important to note that the positions and orientations shown for display 10, reflective polarizer 20, and mirror 30, as well as angles $\theta_e$, $\theta_{i1}$, and $\theta_{i2}$, are examples only, and additional embodiments are possible without deviating from the inventive concept.

Figure 2:
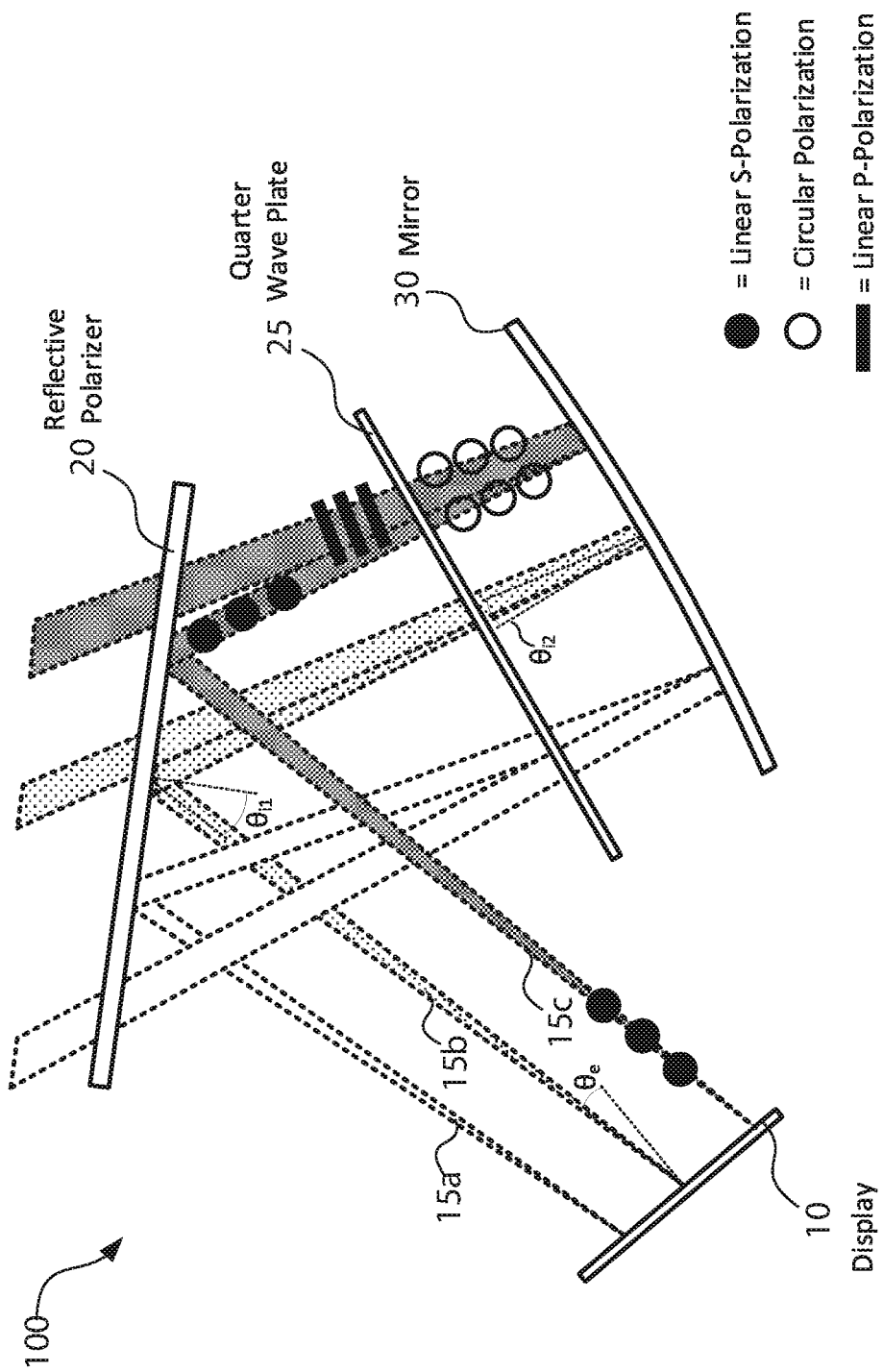
FIG. 2 is a cross-sectional view of a compact heads-up display in accordance with an alternate embodiment described herein.

FIG. 2 is a cross-sectional view of a compact HUD 100 in accordance with an alternate embodiment of the HUD of FIG. 1. Elements of the HUD 100 common to both FIG. 1 and FIG. 2 and which use like reference designators perform substantially the same functions. Exceptions to this are described herein.

As with the embodiment of FIG. 1, HUD 100 of FIG. 2 includes a display 10, a reflective polarizer 20, and mirror 30, amongst which image rays 15 (including example rays 15*a*, 15*b*, and 15*c*) are directed to create an appropriate optical path for displaying the emitted image to a viewer. In the embodiment shown in FIG. 2, however, only a single quarter wave plate 25 is used to change the polarization of image rays 15. In the embodiment shown, quarter wave plate 25 is disposed between reflective polarizer 20 and mirror 30. Image rays 15 are emitted from display 10 and travel to, and are reflected by, reflective polarizer 20. In some embodiments, the image rays 15 are emitted with a linear S-type polarization. After the image rays 15 are reflected by reflective polarizer 20, they encounter and pass through quarter wave plate 25, and the polarization of image rays 15 changes from linear S-type to circular polarization. The image rays 15 are then reflected by mirror 30 and pass through quarter wave plate 25 a second time, this time changing from circular polarization to linear P-type polarization, which is substantially transmitted through reflective polarizer 20. In some embodiments, using a single quarter wave plate 25 may reduce system costs, and may contribute to decreasing HUD volume.

Figure 3A:
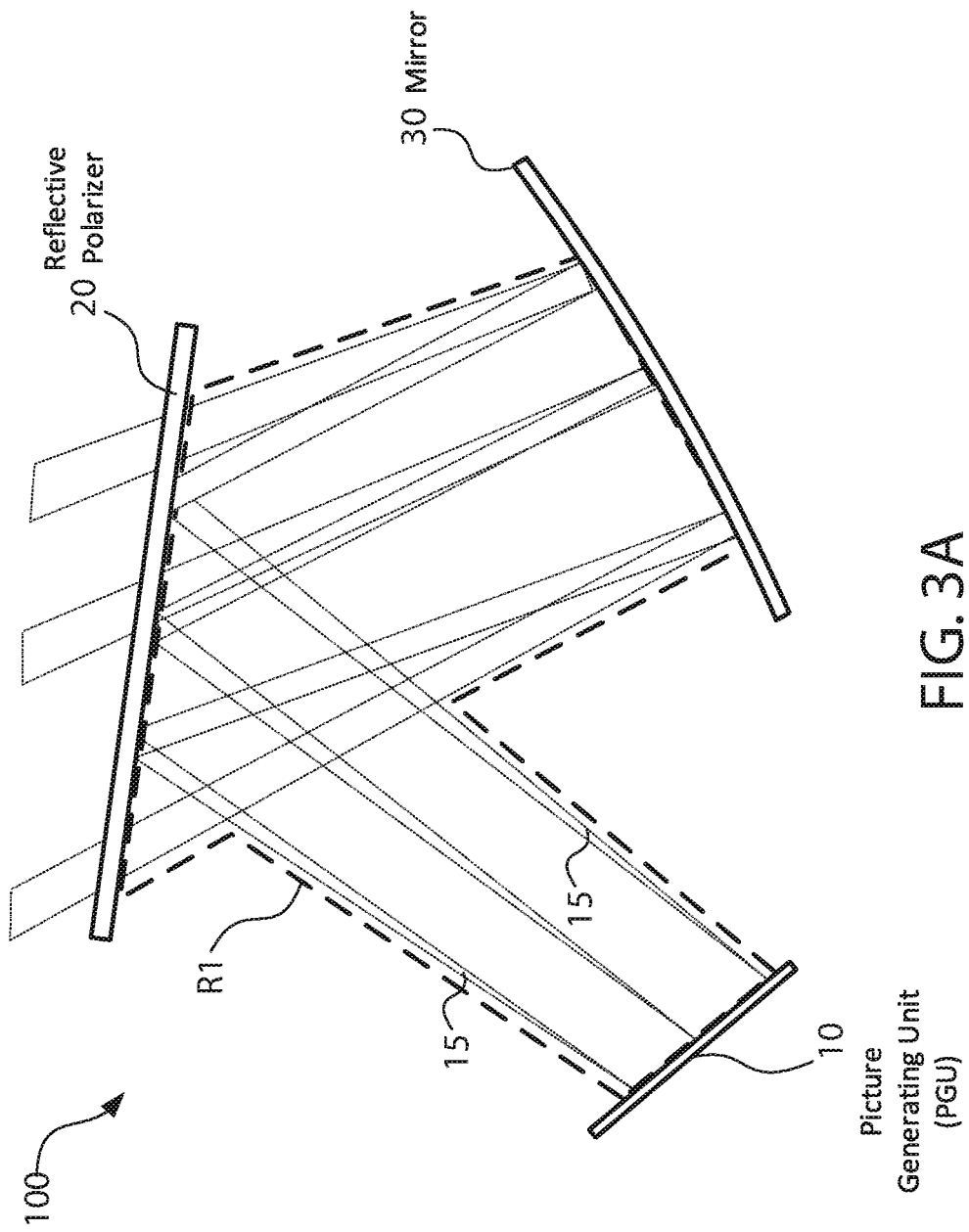
FIGS. 3A-3C depict various example cross-sectional areas defined for a compact heads-up display in accordance with an embodiment described herein.
Figure 3B:
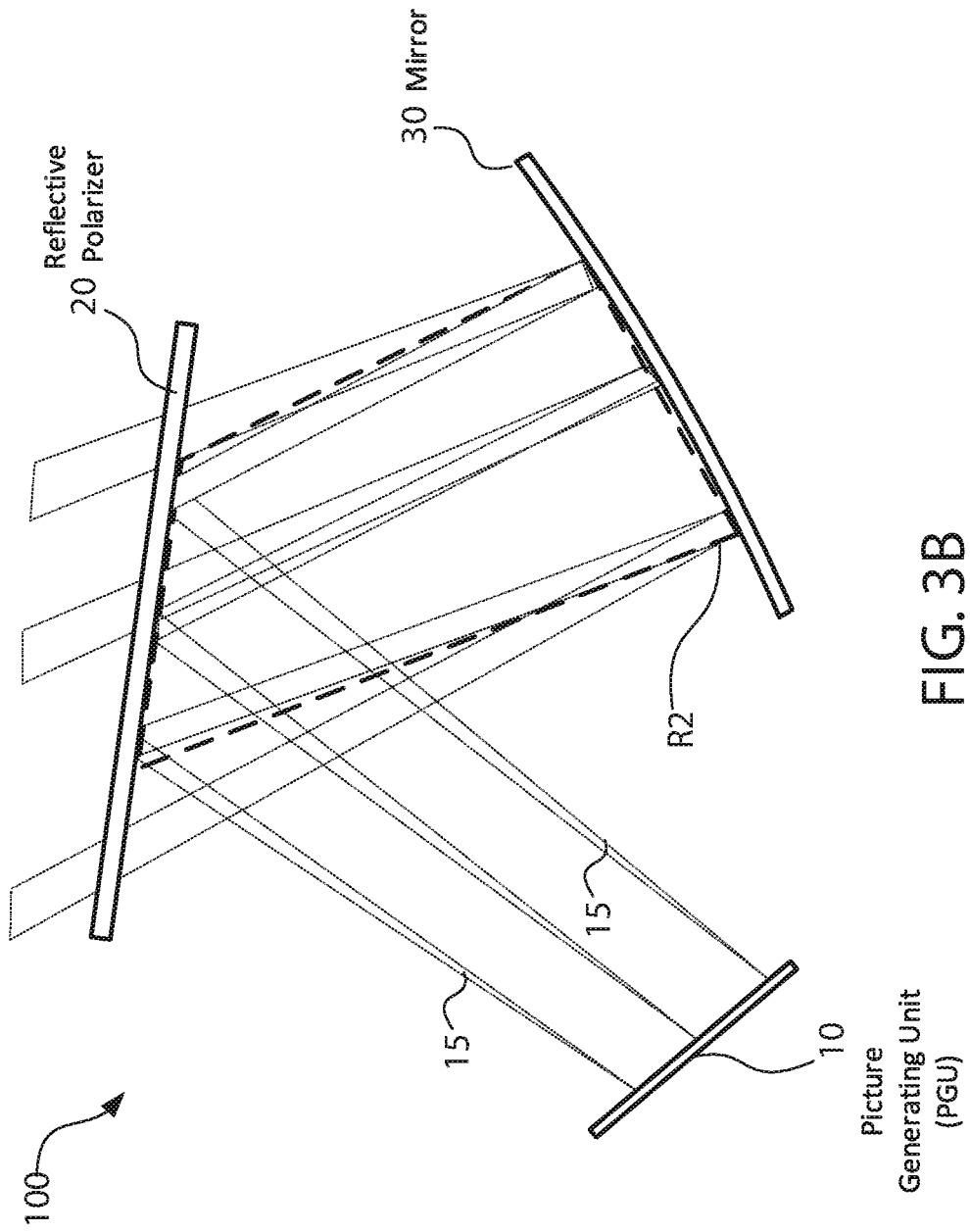
Figure 3C:
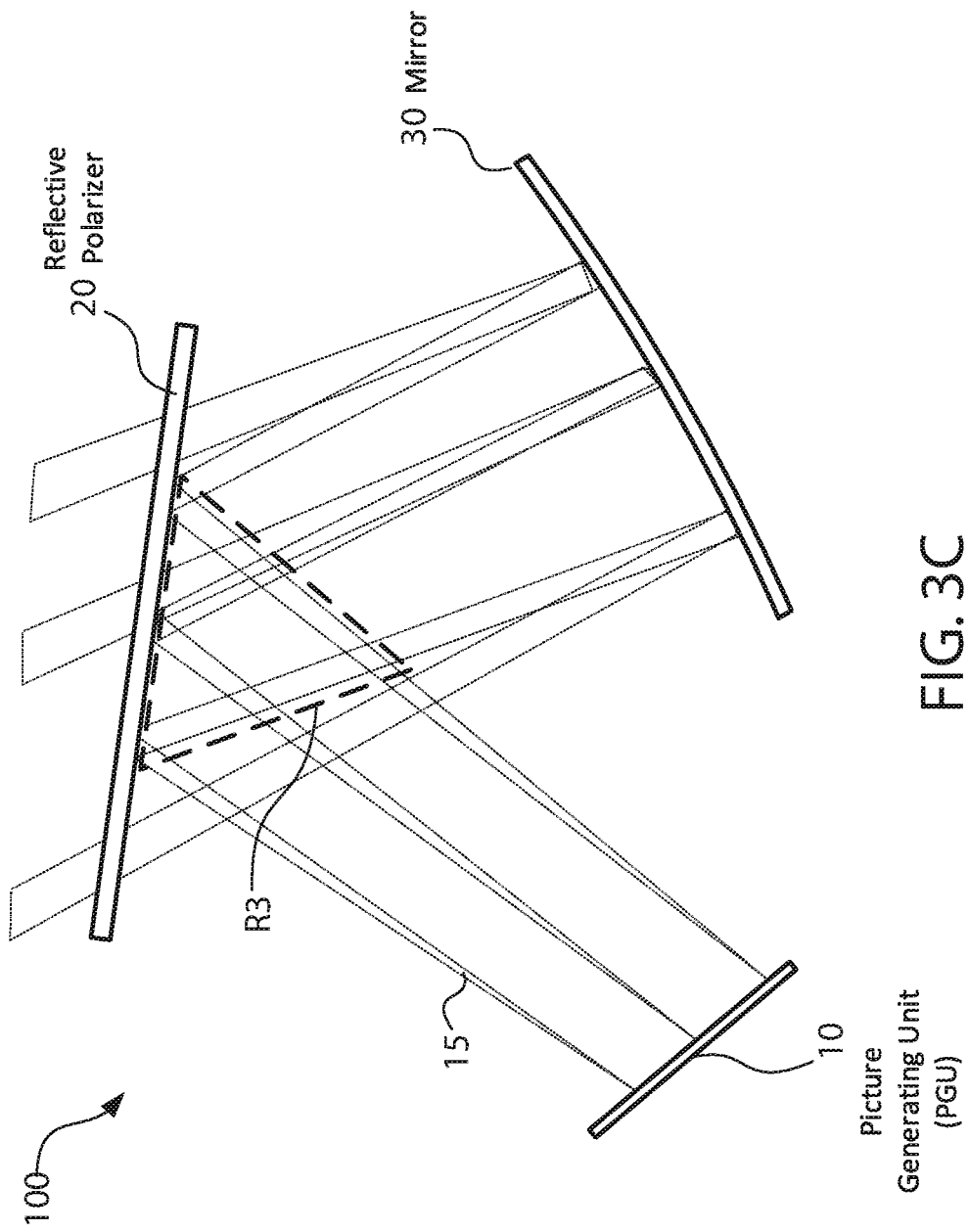

FIGS. 3A-3C depict simplified cross-sectional illustrations of HUD 100 of FIGS. 1 and 2, defining several cross-sectional regions defined by subsets of image rays traveling through the HUD. FIG. 3A shows example region R1, shown outlined by a dashed line, wherein the region is defined by those portions of emitted image rays 15 that pass at least once across the R1 region. It should be noted that "one-pass" region R1 is a two-dimensional, cross-sectional representation of a larger three-dimensional volume that would be defined by a first pass of image rays 15 through an actual HUD 100.

FIG. 3B shows example region R2, shown outlined by a dashed line, wherein the region R2 is defined by those portions of emitted image rays 15 that pass at least twice across the R2 region. In other words, region R2 is a sub-region of region R1, defining only the region where image rays have passed at least twice through that region. Similarly, FIG. 3C shows example region R3, shown outlined by a dashed line, wherein the region R3 is defined by those portions of emitted image rays 15 that pass at least three times across the R3 region. In other words, region R3 is a sub-region of both regions R1 and R2, defining only the region where image rays have passed three times through that region.

Figure 4:
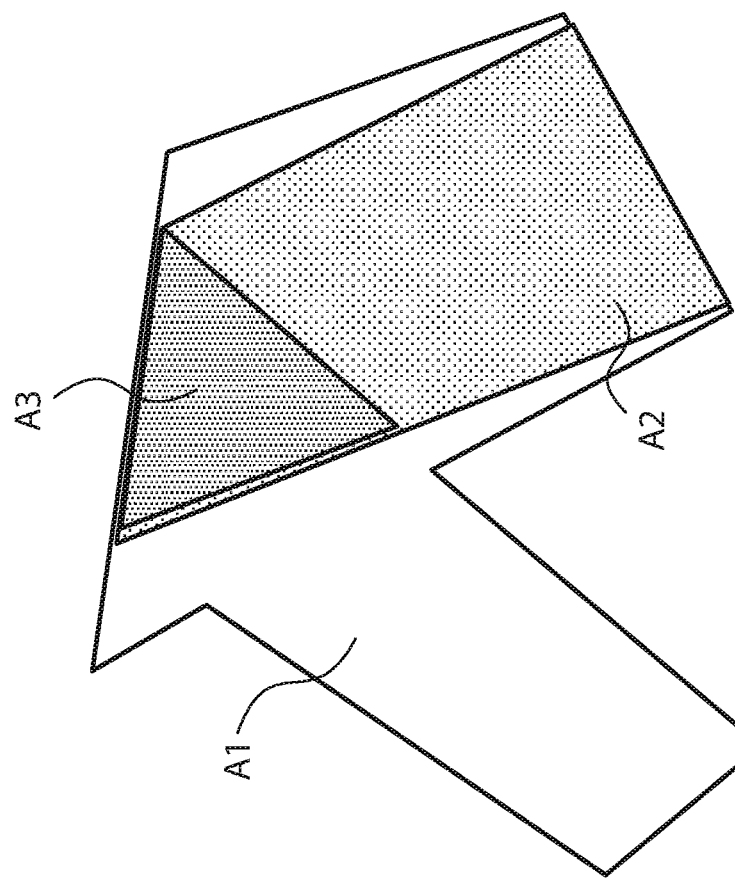
FIG. 4 illustrates the relationship of various example cross-sectional areas defined for a compact heads-up display in accordance with an embodiment described herein.
Figure 5A:
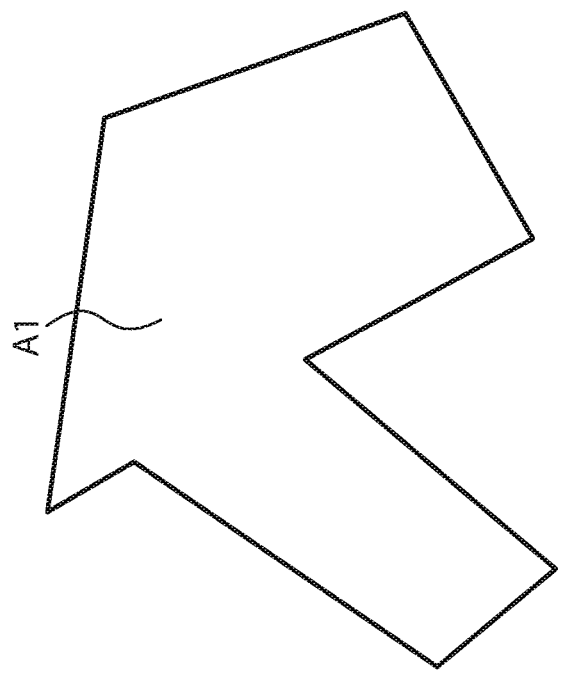
FIGS. 5A-5C depict individual example cross-sectional areas defined for a compact heads-up display in accordance with an embodiment described herein.
Figure 5B:
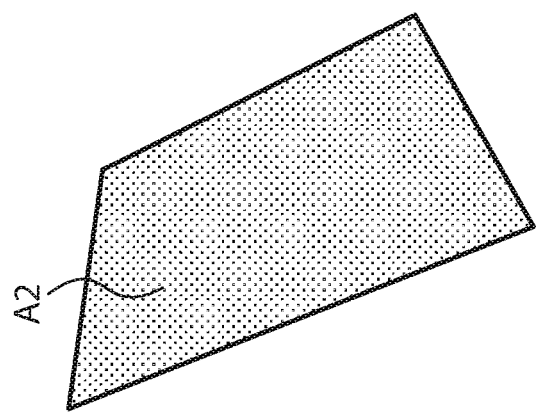
Figure 5C:
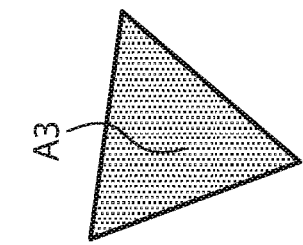

Regions R1, R2, and R3 have respective areas A1, A2, and A3. FIG. 4 illustrates the relationship of areas A1, A2, and A3 as defined for the example HUD 100 of FIG. 1, contained and overset in a single drawing. FIGS. 5A-5C separate the three areas and displays them side by side for the purposes of comparison. By comparing the ratio of areas, and, in particular, the ratio of A3 to A1, one can create a quantitative measure of the relative amount of "area sharing" defined by the system. That is, the size of area A2 represents the portion of area A1 that is shared by first-pass image rays and second-pass image rays, and the size of area A3 represents the portion of area A1 that is shared by first-pass, second-pass, and third-pass image rays. The larger area A3 is relative to areas A2 and A1, the less "new" area needs to be consumed by the reflected image rays. As described elsewhere within, the relative positions and orientations of the HUD components (e.g., display, reflective polarizer, and mirror) may be chosen so as to maximize the ratio of A3 to A2, and/or of A3 to A1, increasing the amount of volumetric space used to contain multiple passes of the images rays through the HUD. By designing a system wherein the ratio A3/A2 is sufficiently large, the corresponding volume required by the HUD demonstrates a corresponding reduction.

The resolution and performance of an optical system such as a HUD can be characterized using a modulation transfer function. The modulation transfer function (MTF) provides a measurement of the HUD's ability to transfer image contrast information (or image detail) from the original displayed image to the viewer as a virtual image at a specific resolution. A graph showing the MTF for an optical system typically has two axes, with the MTF plotted on the vertical axis (y axis) and spatial frequency plotted along the horizontal axis (x axis). The MTF is a number ranging from 0.0 (no detail is transferred) to 1.0 (maximum detail transferred, the ideal case). Spatial frequency is typically measured in cycles per millimeter (e.g., line pairs per millimeter, where a "line pair" is a sequence of one black line and one white line.) FIGS. 6-9 provide graphs plotting the MTF for a compact HUD according to embodiments described herein using various shapes of mirrors and values for the first incident angle, $\theta_{i1}$.

Figure 6:
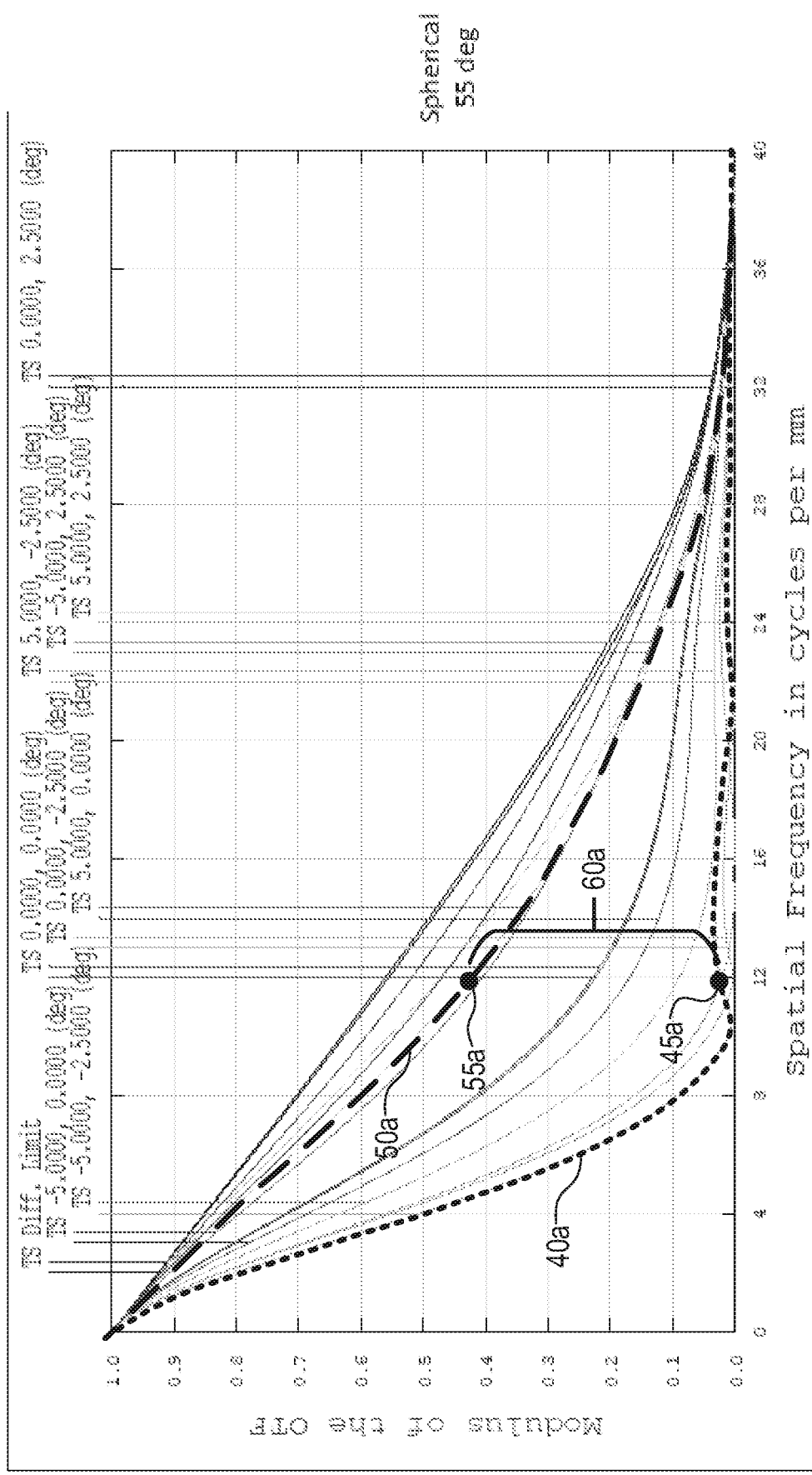
FIG. 6 is a graph plotting the modulation transfer function (MTF) for a compact heads-up display using a spherical mirror with a reflective polarizer mounted at an angle of 55 degrees in accordance with an embodiment described herein.

Turning to FIG. 6, a graph plotting the MTF for a compact HUD using a spherical mirror and a reflective polarizer mounted such that the first incident angle, $\theta_{i1}$, is approximately 55 degrees is shown. The graph contains lines representing the MTF values measured at each of several points of the image display, with each curve on the graph showing the values measured at a specific point for spatial frequencies from 0 to 40 cycles/mm. Coordinates used for the measured display are as follows:

Center of display: (0.0, 0.0)
Lower left corner of display: (−5.0, −2.5)
Upper left corner of display: (−5.0, 2.5)
Lower right corner of display: (5.0, −2.5)
Upper right corner of display: (5.0, 2.5)
Top center of display: (0.0, 2.5)
Bottom center of display: (0.0, −2.5)
Center of left edge of display: (−5.0, 0.0)
Center of right edge of display: (5.0, 0.0)

Two curves are provided for each of the above points on the graph, one for MTF in the tangential direction and one for MTF in the sagittal direction. For simplicity, the following discussion will focus on the tangential MTF for two diagonally-opposite corners on the display, the corners at (−5.0, −2.5) and (5.0, 2.5). Line 40*a* of FIG. 6 corresponds to the lower left corner of the display at (−5.0, −2.5), and line 50*a* corresponds to the upper right corner of the display at (5.0, 2.5). Focusing on a spatial frequency of 12 cycles per mm, we see that line 40*a* crosses the line for a spatial frequency of 12 cycles/mm at point 45*a* (representing an MTF of approximately 0.02), and line 50*a* crosses the line for 12 cycles/mm at point 55*a* (representing an MTF of approximately 0.42), creating a difference in MTF 60*a* of approximately 0.40. In other words, in an embodiment using a spherical mirror and a reflective polarizer mounted such that the first incident angle, $\theta_{i1}$, is approximately 55 degrees, results in a difference in MTF values for opposite corners of the display of approximately 0.40.

Figure 7:
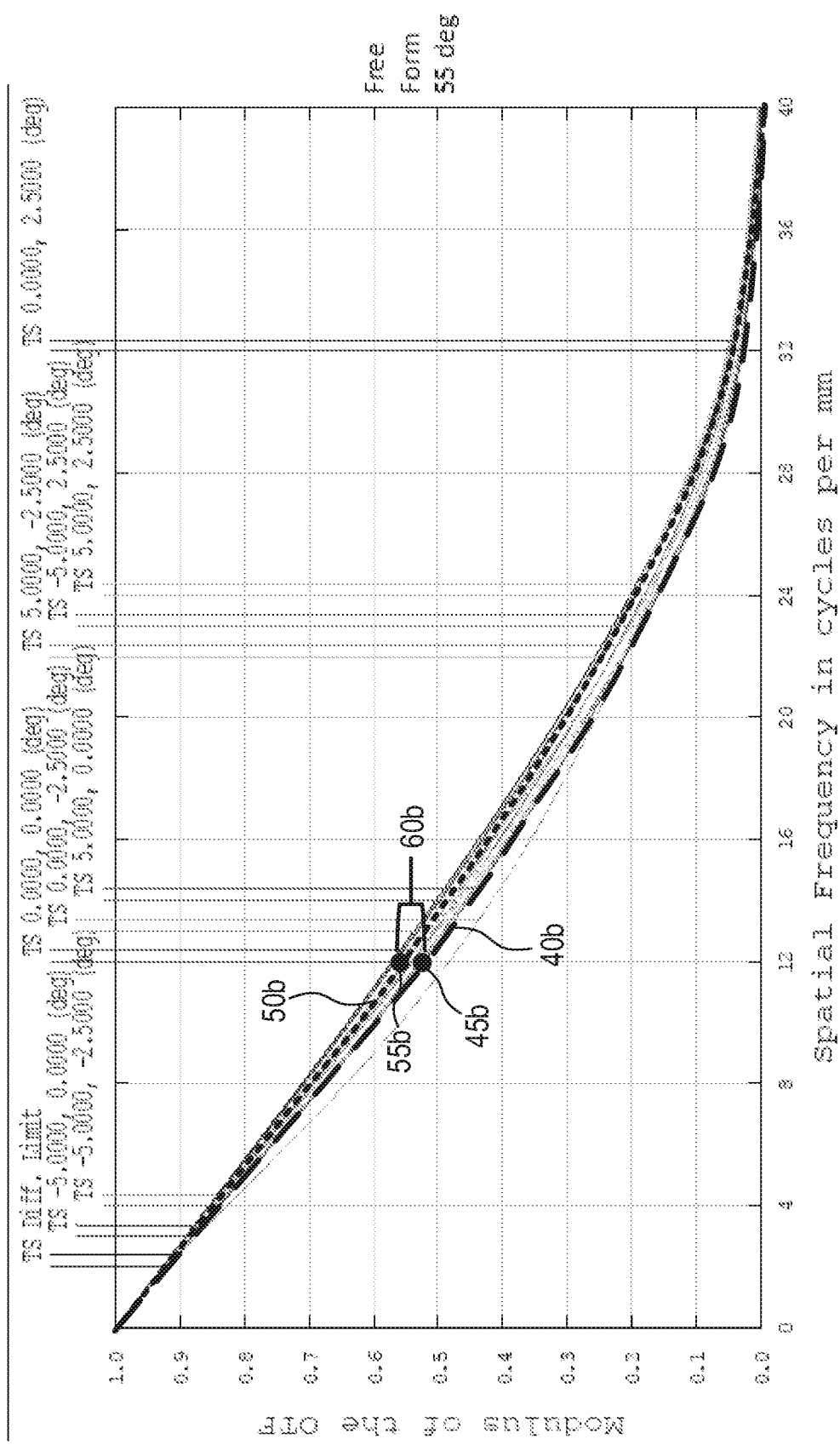
FIG. 7 is a graph plotting the MTF for a compact heads-up display using a free-form mirror with a reflective polarizer mounted at an angle of 55 degrees in accordance with an embodiment described herein.

In some embodiments, it may be possible to correct for this significant difference in MTF values by using a free-form mirror in place of a spherical mirror. FIG. 7 is a graph plotting the MTF for a compact HUD using a free-form mirror with a reflective polarizer mounted to have a $\theta_{i1}$ of 55 degrees in accordance with an embodiment described herein. Line 40b of FIG. 7 corresponds to the lower left corner of the display at (−5.0, −2.5), and line 50b corresponds to the upper right corner of the display at (5.0, 2.5). As before, focusing on a spatial frequency of 12 cycles per mm, we see that line 40b crosses the line for a spatial frequency of 12 cycles/mm at point 45b (representing an MTF of approximately 0.53), and line 50b crosses the line for 12 cycles/mm at point 55b (representing an MTF of approximately 0.56), creating a difference in MTF 60b of only approximately 0.03. It should be noted that switching to a free-form mirror design improved the overall MTF over the spherical case of FIG. 6 (both lines 40b and 50b are higher than corresponding values in FIG. 6), and significantly reduced the difference in MTF between the two diagonally opposite corners of the display.

Looking at the chart of FIG. 7, created for an optical system (e.g., a HUD) with a first incident angle, $\theta_{i1}$, of 55 degrees, an image having a spatial frequency of about 4 line pairs (cycles) per mm emitted from a corner of a display within the HUD, magnified by the optical system, and transmitted by the reflective polarizer as a virtual image for viewing by a viewer should have a tangential MTF greater than about 0.8. The same emitted image having a spatial frequency of about 12 line pairs (cycles) per mm and being transmitted through the HUD and reflective polarizer to be viewed by a viewer, should have a tangential MTF greater than about 0.5.

Figure 8:
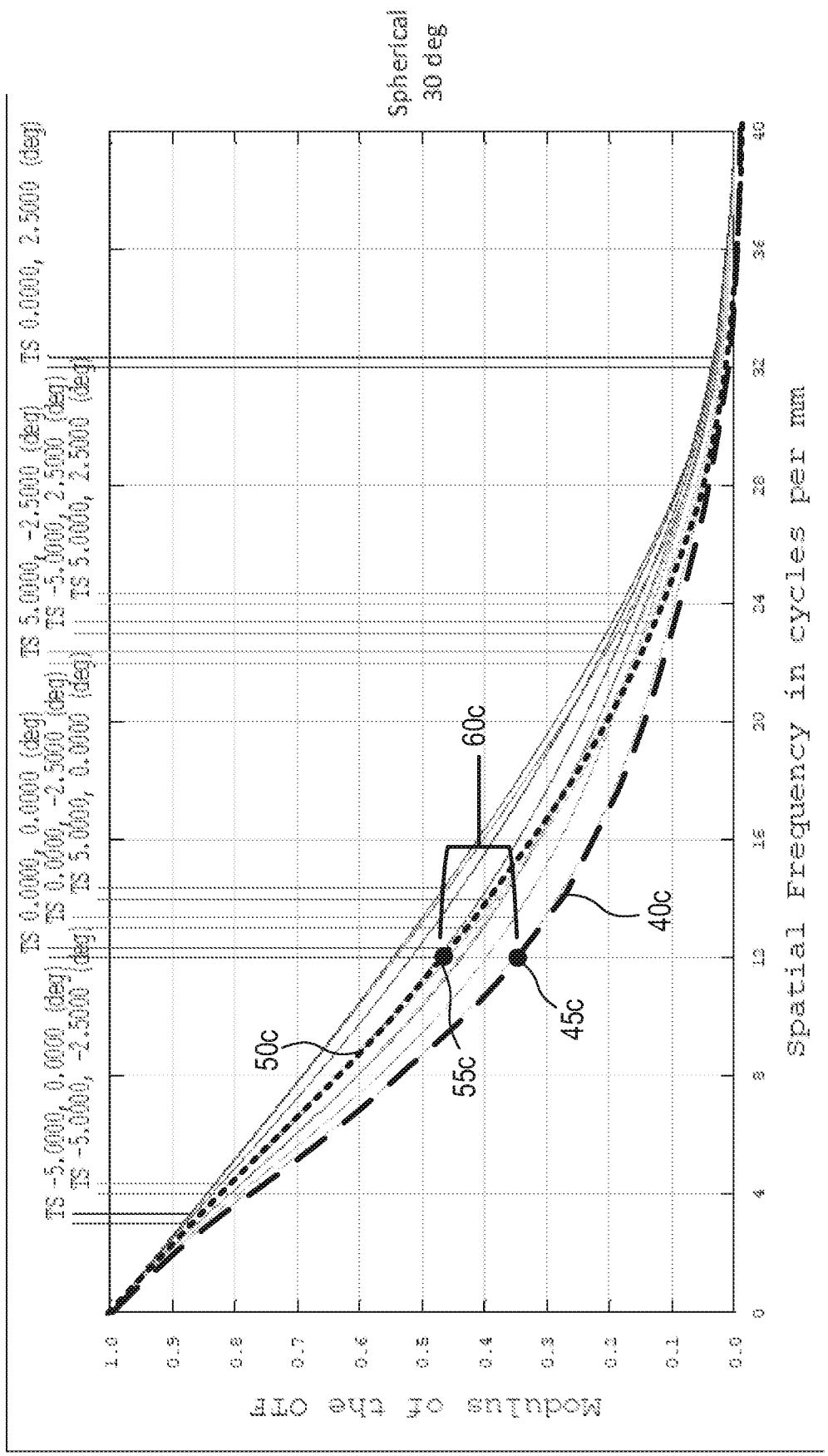
FIG. 8 is a graph plotting the MTF for a compact heads-up display using a spherical mirror with a reflective polarizer mounted at an angle of 30 degrees in accordance with an embodiment described herein.
Figure 9:
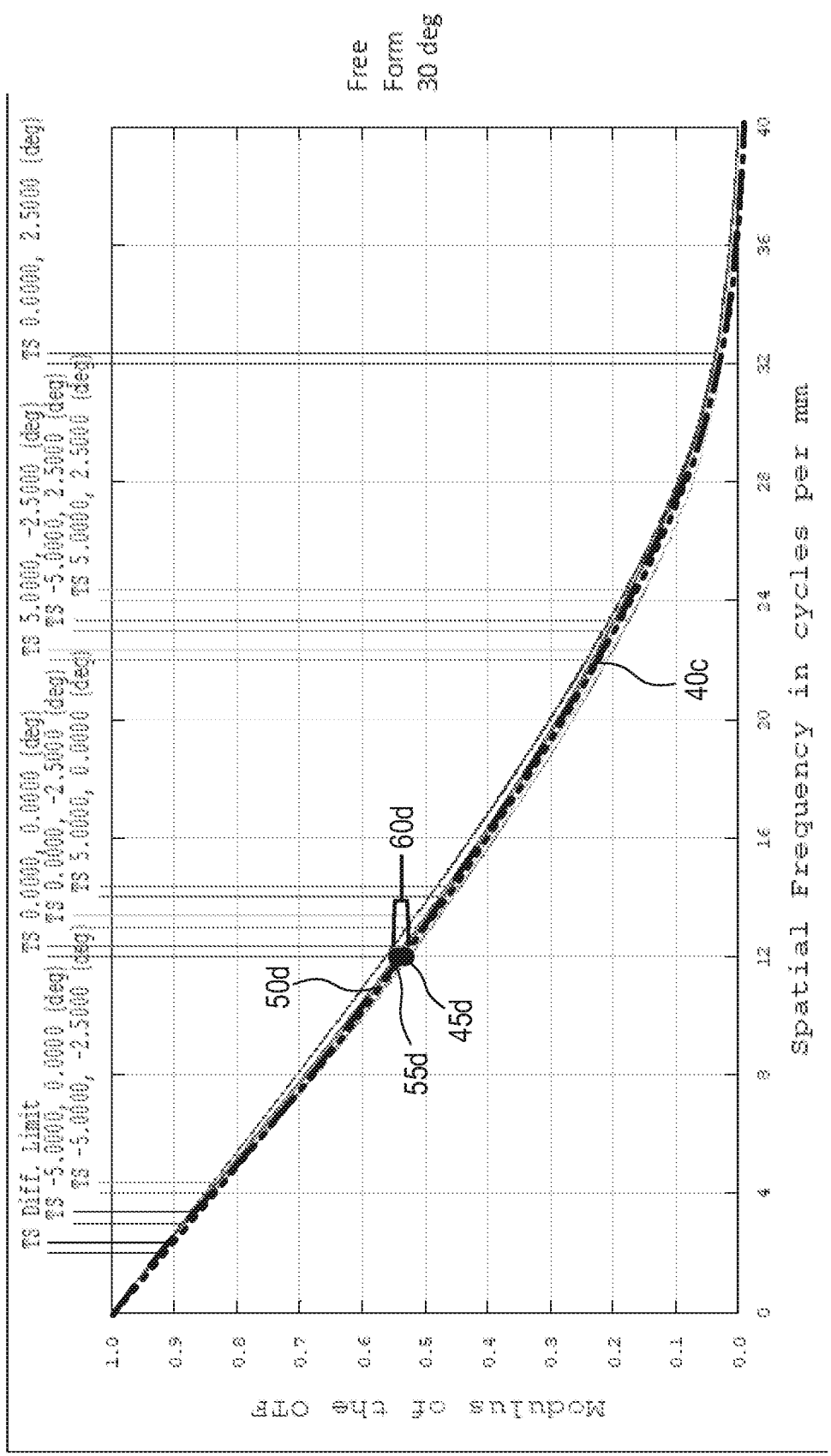
FIG. 9 is a graph plotting the MTF for a compact heads-up display using a free-form mirror with a reflective polarizer mounted at an angle of 20 degrees in accordance with an embodiment described herein.

FIGS. 8 and 9 provide another example of MTF values for spherical mirrors versus free-form mirrors. FIG. 8 plots the MTF for a compact HUD using a spherical mirror with a reflective polarizer mounted with a first incident angle, $\theta_{i1}$, of 30 degrees. Line 40c of FIG. 8 corresponds to the lower left corner of the display at (−5.0, −2.5), and line 50c corresponds to the upper right corner of the display at (5.0, 2.5). At a spatial frequency of 12 cycles per mm, we see that line 40c crosses the line for a spatial frequency of 12 cycles/mm at point 45c (representing an MTF of approximately 0.35), and line 50c crosses the line for 12 cycles/mm at point 55c (representing an MTF of approximately 0.47), creating a difference in MTF 60c of approximately 0.12. FIG. 9 plots the MTF for a compact HUD using a free-form mirror with a reflective polarizer mounted with a first incident angle, $\theta_{i1}$, of 30 degrees. Line 40d of FIG. 9 corresponds to the lower left corner of the display at (−5.0, −2.5), and line 50d corresponds to the upper right corner of the display at (5.0, 2.5). At 12 cycles per mm, we see that line 40d crosses the line for a spatial frequency of 12 cycles/mm at point 45d (representing an MTF of approximately 0.53), and line 50d crosses the line for 12 cycles/mm at point 55d (representing an MTF of approximately 0.55), creating a difference in MTF 60c of approximately 0.02. As in the comparison of the embodiments of FIGS. 6 and 7, FIGS. 8 and 9 show an overall increase in MTF when a free-form mirror is used over a spherical mirror, and a significantly reduced difference between the MTF values of the diagonally opposite corners.

Looking at the chart of FIG. 9, created for an optical system (e.g., a HUD) with a first incident angle, $\theta_{i1}$, of 30 degrees, an image having a spatial frequency of about 10 line pairs (cycles) per mm emitted from a corner of a display within the HUD, magnified by the optical system, and transmitted by the reflective polarizer as a virtual image for viewing by a viewer should have a tangential MTF greater than about 0.6. The same emitted image having a spatial frequency of about 18 line pairs (cycles) per mm and being transmitted through the HUD and reflective polarizer to be viewed by a viewer, should have a tangential MTF greater than about 0.3.

Figure 10:
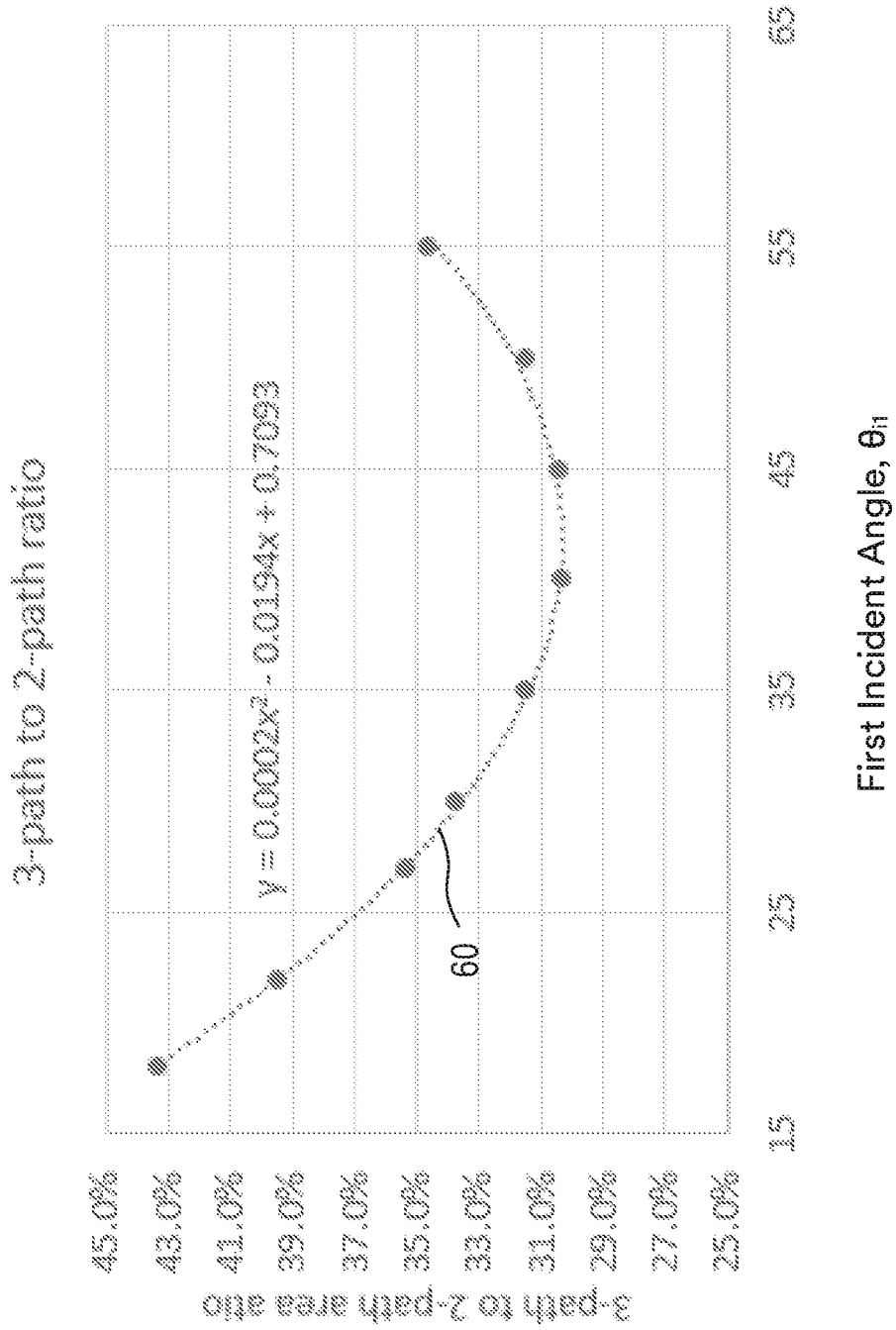
FIG. 10 is a chart depicting a ratio of 3-path area to 2-path area for a compact heads-up display in accordance with an embodiment described herein.
Figure 11:
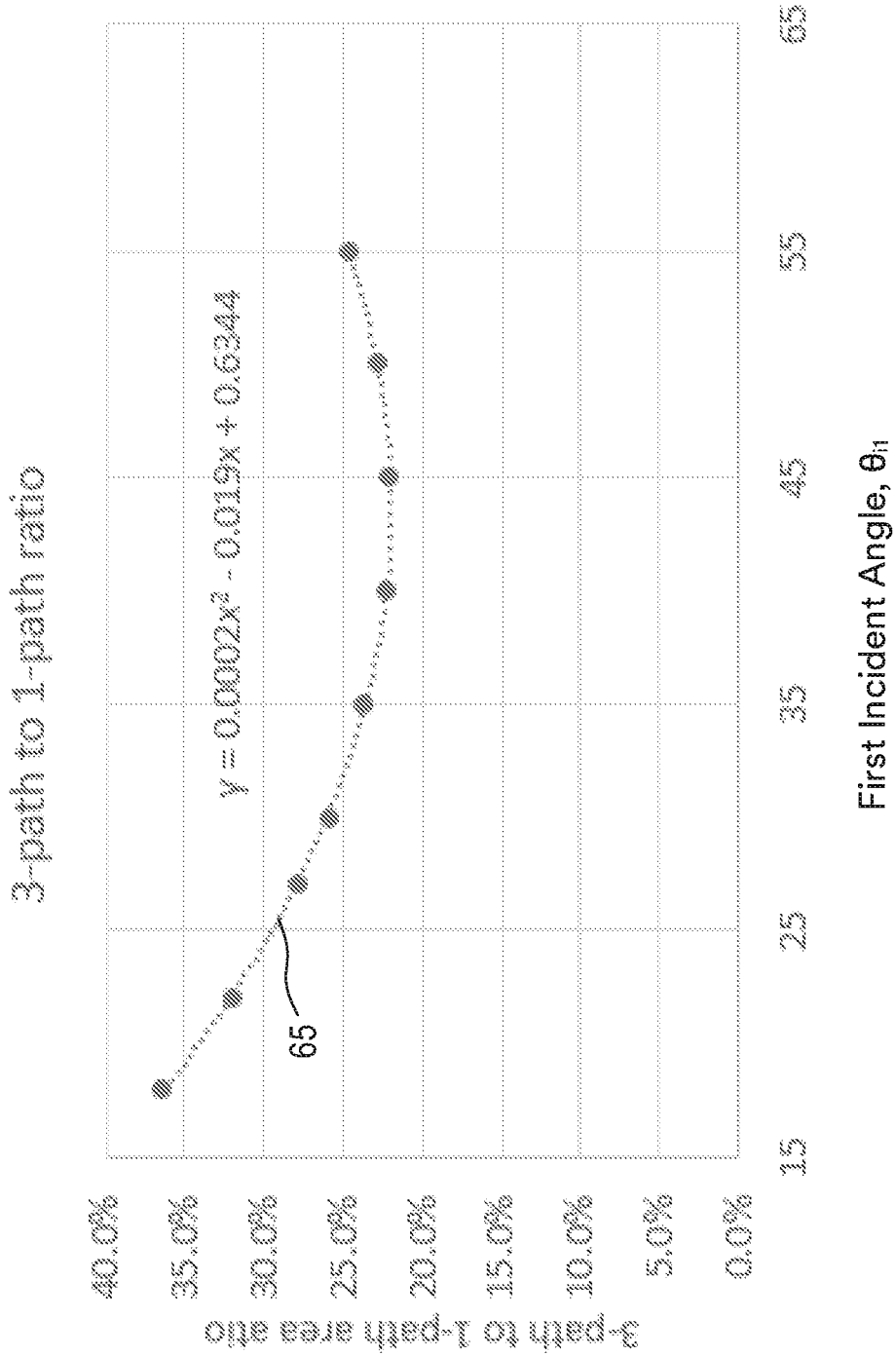
FIG. 11 is a chart depicting a ratio of 3-path area to 1-path area for a compact heads-up display in accordance with an embodiment described herein.

FIG. 10 is a chart depicting the ratio of 3-path area to 2-path area for a compact HUD in accordance with an embodiment as described herein for various values of $\theta_{i1}$. That is, line 60 on the graph of FIG. 10 plots the result of dividing the total 3-path area by the total 2-path area in an example HUD as a percentage over a range of various first incident angles ($\theta_{i1}$) for the reflective polarizer. FIG. 11 is a chart depicting the ratio of 3-path area to 1-path area for a compact HUD for various values of $\theta_{i1}$. That is, line 65 in FIG. 11 plots the result of dividing the total 3-path area by the total 1-path area in an example HUD as a percentage over a range of various first incident angles ($\theta_{i1}$) for the reflective polarizer. As previously described, the value of the first incident angle, $\theta_{i1}$, is one design factor which can be modified to maximize the ratio of 3-path area to both 1-path and 2-path area, enabling heads-up displays exhibiting more compact volumes.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system, comprising:
a reflective polarizer; and
a display and a mirror disposed on a same side of, and generally facing, the reflective polarizer, for normally incident light in a predetermined wavelength range extending across at least a portion of a visible spectrum:
the reflective polarizer transmitting at least 80% of the incident light having a first polarization state and reflecting at least 80% of the incident light having an orthogonal second polarization state; and
the mirror reflecting at least 80% of the incident light for each of the first and second polarization states; the display adapted to emit an image for viewing by a viewer, the emitted image comprising an emitted central image cone emitted from a central location of the display, the emitted central image cone comprising an emitted central image ray emitted from the central location of the display at a central emission angle greater than about 5 degrees, the reflective polarizer receiving the emitted central image ray at a first incident angle at a central location of the reflective polarizer and reflecting at least 80% of the received emitted central image ray as a first reflected image ray, the mirror receiving the first reflected image ray at a second incident angle at a central location of the mirror and reflecting at least 80% of the received first reflected image ray as a second reflected image ray, the reflective polarizer receiving and transmitting at least 80% of the second reflected image ray,
the central locations of the display, the reflective polarizer and the mirror defining a midplane comprising first, second and third regions, such that for emitted image rays emitted from the display and propagating along and in the midplane and prior to being incident on the reflective polarizer for a second time:
the first region comprises portions of the emitted image rays that pass at least once across the first region;
the second region comprises portions of the emitted image rays that pass at least twice across the second region; and
the third region comprises portions of the emitted image rays that pass three times across the third region;
the first, second and third regions having respective areas A1, A2 and A3, A3/A2≥0.2, or 0.22, or 0.24, or 0.26, or 0.28, or 0.3.

2. The optical system of claim 1, wherein the first incident angle is between about 25 and 35 degrees, and A3/A2≥0.3.

3. The optical system of claim 1, wherein the first incident angle is greater than about 10 degrees, and A3/A2≥0.3.

4. The optical system of claim 1, wherein the first incident angle is between about 15 and 20 degrees, and A3/A2≥0.4.

5. The optical system of claim 1, wherein the display has a diagonal dimension of greater than about 1 inch and less than about 5 inches.

6. The optical system of claim 1, wherein the first incident angle is greater than about 45 degrees, and A3/A2≥0.3.

7. The optical system of claim 1, wherein the visible spectrum extends at least from about 400 nm to about 600 nm.

8. A heads-up display comprising:
the optical system of claim 1; and
a windshield of a vehicle configured to reflect an image transmitted by the reflective polarizer toward the viewer, such that the viewer views a virtual image of the image emitted by the display.

9. The optical system of claim 1, such that when the first incident angle is about 55 degrees and an image having a spatial frequency of about 4 line pairs per mm is emitted from a corner of the display, the optical system magnifies the emitted image, after the emitted image is transmitted by the reflective polarizer, as a virtual image for viewing by a viewer, a tangential modulation transfer function (MTF) of the virtual image greater than about 0.55, or about 0.6, or about 0.7, or about 0.8.

10. The optical system of claim 1, such that when the first incident angle is about 55 degrees and an image having a spatial frequency of about 12 line pairs per mm is emitted from a corner of the display, the optical system magnifies the emitted image, after the emitted image is transmitted by the reflective polarizer, as a virtual image for viewing by a viewer, a tangential modulation transfer function (MTF) of the virtual image greater than about 0.1, or about 0.2, or about 0.3, or about 0.4, or about 0.5.

11. The optical system of claim 1, such that when the first incident angle is about 30 degrees and an image having a spatial frequency of about 10 line pairs per mm is emitted from a corner of the display, the optical system magnifies the emitted image, after the emitted image is transmitted by the reflective polarizer, as a virtual image for viewing by a viewer, a tangential modulation transfer function (MTF) of the virtual image greater than about 0.60.

12. The optical system of claim 1, such that when the first incident angle is about 30 degrees and an image having a spatial frequency of about 18 line pairs per mm is emitted from a corner of the display, the optical system magnifies the emitted image, after the emitted image is transmitted by the reflective polarizer, as a virtual image for viewing by a viewer, a tangential modulation transfer function (MTF) of the virtual image greater than about 0.20, or about 0.25, or about 0.3.

13. The optical system of claim 1, wherein the central emission angle is greater than about 7 degrees.

14. The optical system of claim 1, wherein the central emission angle is greater than about 10 degrees.

15. The optical system of claim 1, further comprising at least one quarter wave plate.

16. The optical system of claim 1, wherein the reflective polarizer comprises a multilayer optical film.

17. The optical system of claim 1, wherein the mirror comprises a multilayer optical film.

18. An optical system comprising a reflective polarizer, a display and a mirror, for normally incident light in a predetermined wavelength range extending across at least from about 450 nm to about 600 nm:
the reflective polarizer transmitting at least 60% of the incident light having a first polarization state and reflecting at least 60% of the incident light having an orthogonal second polarization state; and the mirror reflecting at least 50% of the incident light for each of the first and second polarization states; an image emitted by the display transmitted by the reflective polarizer for viewing by a viewer after being first reflected by the reflective polarizer and the mirror, the optical system having an optical axis such that a light ray emitted by the display and propagating along the optical axis is substantially normally incident on the mirror after being reflected by the reflective polarizer, a midplane comprising the optical axis comprising one-pass and three-pass regions having respective areas A1 and A3, such that for emitted image rays emitted from the display and propagating along and in the midplane and prior to being incident on the reflective polarizer for a second time:

the one-pass region comprises portions of the emitted image rays that pass at least once across the one-pass region; and the three-pass region comprises portions of the emitted image rays that pass three times across the three-pass region, A3/A1≥0.2, and such that when an image having a spatial frequency of about 12 line pairs per mm is emitted from a corner of the display, the optical system magnifies the emitted image, after the emitted image is transmitted by the reflective polarizer, as a virtual image for viewing by a viewer, a tangential modulation transfer function (MTF) of the virtual image greater than about 0.3.

19. The optical system of claim 18, wherein the tangential modulation transfer function (MTF) comprises first and second tangential modulation transfer functions (MTF1, MTF2) for the image emitted from respective diagonally opposite first and second corners of the display, a difference between MTF1 and MTF2 being less than about 0.03, or about 0.02, or about 0.01.

20. The optical system of claim 18, wherein the light ray is emitted from a central location of the display at an emission angle greater than about 5 degrees.

\* \* \* \* \*